(12) United States Patent
Cummings et al.

(10) Patent No.: US 8,996,861 B1
(45) Date of Patent: Mar. 31, 2015

(54) SECURE COMMUNICATIONS SYSTEM FOR MOBILE DEVICES

(71) Applicant: Cummings Engineering Consultants, Inc., Chandler, AZ (US)

(72) Inventors: Darren Lynn Cummings, Chandler, AZ (US); James Chester Jones, Chandler, AZ (US)

(73) Assignee: Saife, Inc. AZ (US)

( * ) Notice: Subject to any disclaimer, the term of this patent is extended or adjusted under 35 U.S.C. 154(b) by 0 days.

(21) Appl. No.: 13/657,872

(22) Filed: Oct. 23, 2012

Related U.S. Application Data

(63) Continuation of application No. 12/916,535, filed on Oct. 30, 2010, now Pat. No. 8,392,699.

(51) Int. Cl.
*H04L 9/00* (2006.01)
*H04L 9/32* (2006.01)
*H04L 29/06* (2006.01)
*H04W 12/04* (2009.01)

(52) U.S. Cl.
CPC ............ *H04L 9/321* (2013.01); *H04L 63/0428* (2013.01); *H04W 12/04* (2013.01)
USPC ........................... 713/155; 380/270; 455/466

(58) Field of Classification Search
CPC .... H04L 63/0823; H04L 63/08; H04L 63/061
USPC ................... 713/155, 150; 380/270; 455/466
See application file for complete search history.

(56) References Cited

U.S. PATENT DOCUMENTS

| | | | |
|---|---|---|---|
| 6,772,331 B1 * | 8/2004 | Hind et al. ..................... 713/151 |
| 8,327,146 B2 * | 12/2012 | Madhavan et al. ............ 713/175 |
| 8,392,699 B2 * | 3/2013 | Jones et al. ................... 713/150 |
| 2004/0221154 A1 * | 11/2004 | Aggarwal ...................... 713/151 |
| 2007/0133803 A1 * | 6/2007 | Saito et al. .................... 380/267 |
| 2007/0168660 A1 * | 7/2007 | Little et al. .................... 713/158 |
| 2009/0164785 A1 * | 6/2009 | Metke et al. .................. 713/169 |
| 2011/0130119 A1 * | 6/2011 | Gupta et al. ................... 455/411 |

* cited by examiner

*Primary Examiner* — Matthew Smithers

(57) ABSTRACT

A comprehensive solution for providing secure mobile communication is provided. The system includes techniques for authentication and control of communication end-points; chain of trust to ensure devices are certified as authentic; contact list management; peer-to-peer encrypted voice, email, and texting communication; and a technique for bypassing an IP PBX to ensure high levels of security. The system is able to support use of commodity mobile communication devices (e.g., smart phones, laptops) over public carrier networks.

18 Claims, 14 Drawing Sheets

SECURE COMMUNICATIONS SYSTEM FOR MOBILE DEVICES

CROSS-REFERENCE TO RELATED APPLICATIONS

The present application is a continuation to Ser. No. 12/916,535 filed Oct. 30, 2010; and is related to and claims priority from prior provisional application Ser. No. 61/256,981 filed Oct. 31, 2009, and Ser. No. 61/331,802 filed May 5, 2010 the contents of which are incorporated herein by reference.

FIELD OF THE INVENTION

The present invention relates to a comprehensive solution to providing secure mobile communication.

BACKGROUND OF THE INVENTION

Certain types of communications are required to be made in confidence. For example, U.S. government classified information must be communicated at the highest levels of confidence. As another example, a business executive might wish to make a call regarding an important business deal, and this discussion must be kept confidential until the deal is finally worked out. As yet another example, in the healthcare industry, the privacy rules set forth in the Health Insurance Portability and Accountability Act (HIPAA) mandate that any individually identifiable health information must be maintained in strict confidence. Thus, health care providers which send such information using conventional email, voice and fax systems risk liability. Similar concerns are raised when lawyers share confidential documents, and, in general, whenever information of a confidential or secret nature is to be shared.

Unfortunately, today's public telephone networks, particularly cellular networks, are not secure. Calls can be easily intercepted by eavesdroppers using inexpensive equipment. Though users enjoy the convenience of their communication devices (such as their Blackberry devices and Apple iPhones) they risk having third parties listening in or otherwise intercepting or tracing their calls. Furthermore, when such devices are lost or stolen valuable information can sometimes be obtained from these devices. Similar concerns exist for email and text messaging.

Traditionally, communication streams transmitted over wireless devices have used National Security Agency (NSA) Type 1 devices to ensure end-to-end encryption for secure transmission of classified information. However, such NSA Type 1 wireless communications devices are generally large, bulky, easily recognized and limited as to the particular wireless networks in which they can operate. Software configured NSA Type 1 wireless communications device configurations have helped overcome some of the mainstream NSA Type 1 communications device limitations, but generally such features still substantially limit the utility of such devices in many real-world field situations. Furthermore, such devices are not available for commercial use.

Moreover, and importantly, even where communication can be protected (such as by encryption), other security issues remain. What is needed is a comprehensive solution to providing secure communication for mobile devices that includes techniques for authentication and control of communication end-points; chain of trust to ensure devices are certified as authentic; contact list management; peer-to-peer encrypted voice, email, and text messaging, etc. Heretofore, no such system has been available.

SUMMARY OF THE INVENTION

A secure communication system for mobile devices preferably includes the following components: the mobile devices; Distributed C3i (communication, control and intelligence) computers for managing the mobile devices (and, in some cases, other Distributed C3i computers); a message broker (which will preferably include several distributed message broker servers) to provide asynchronous communication among the components of the system; and a protected Certificate Authority that acts as the ultimate trust authority. Preferably, the mobile devices include commercially available off-the-shelf mobile devices capable of wireless communication over conventional carrier networks.

The mobile devices and the Distributed C3i computers will be initially provisioned by either an already-provisioned Distributed C3i computer or the Certificate Authority. Preferably, the Distributed C3i computers exist in a configurable management hierarchy, which can (but need not) be the same as the assigned trust hierarchy.

Preferably, the message broker will include distributed servers programmed in accordance with the preferred methods of the present invention and capable of asynchronous communication. As will be described in greater detail, a primary purpose of the message broker is to forward messages among the components of the system. For example, the message broker could act as an intermediary between a Distributed C3i computer and the mobile devices it serves regarding additions or revocations to a contact list. Preferably, the Distributed C3i computers and the mobile devices do not have to be online at the same time during such contact list updating. In a preferred embodiment, the mobile devices are able to "poll" the message broker for any new messages; in alternative preferred embodiments, the message broker is able to "push" the message to the mobile device in real time or near rear time (providing that the mobile device supports such push messaging).

Preferably, the Certificate Authority is a standalone "air gap" computer that serves as a "trusted third party". As will be described in greater detail, when a mobile device, a Distributed C3i computer or a message broker server is initially provisioned, part of the provisioning process involves signing the device's public key with an already-trusted key. The device then "inherits" trust.

In general and as will be described in greater detail, any information sent is sent directly to the recipient, encrypted so that only the recipient may read the information, and signed so that the recipient knows that the message came from the sender and was not tampered with while in transit. Preferably, the present invention uses certified strong encryption (e.g., Federal Information Processing Standard (PIPS) 140-2) to protect the confidentiality, authenticity and integrity of at least three types of communication from mobile devices: E-mail, Voice, and Text Messaging (SMS).

These and other aspects, features, and advantages of the present invention will become apparent from the following detailed description of preferred embodiments, which is to be read in connection with the accompanying drawings.

DETAILED DESCRIPTION

Figure 1:
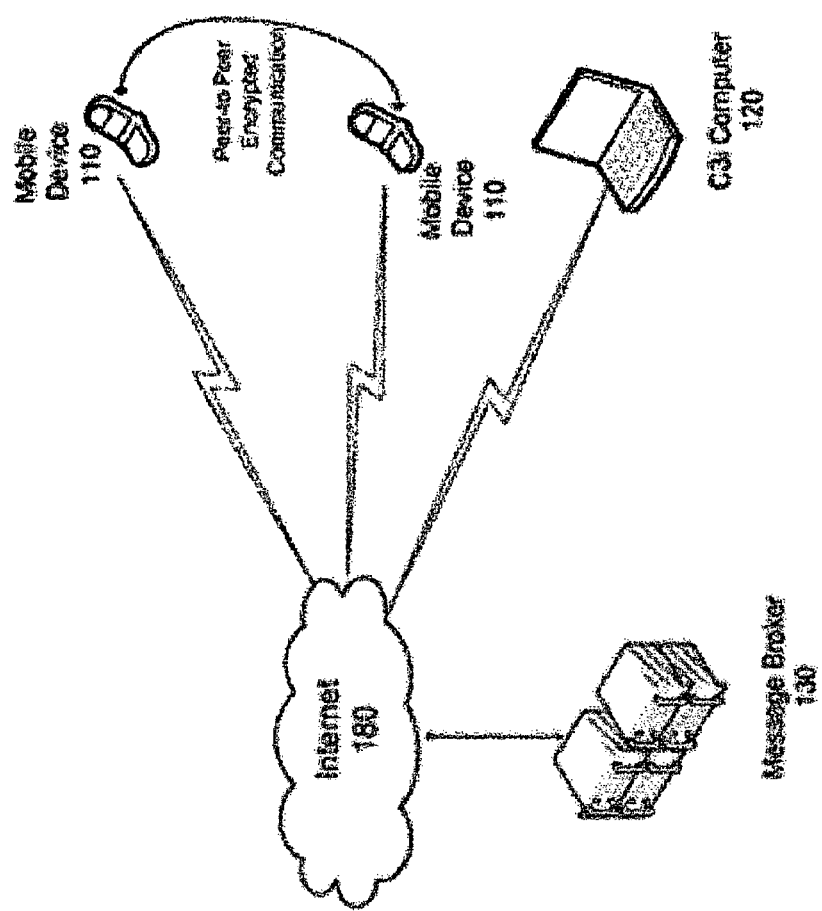
FIG. 1 shows an exemplary diagram of a system for providing secure mobile communication, according to preferred embodiments of the present invention.
Figure 1:
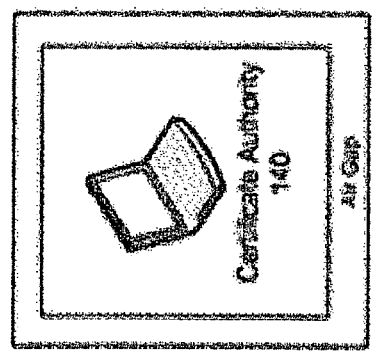

FIG. 1 shows the major components of the present invention, according to preferred embodiments. As illustrated, the present invention preferably includes (1) mobile devices 110, (2) Distributed C3i (communication, control and intelligence) computers 120, (3) a message broker 130, and (4) a protected Certificate Authority 140. As will be described in greater detail, in preferred embodiments of the present invention, the mobile devices 110, the Distributed C3i computers 120, and the message broker 130 are connectable to the Internet 180; and, in contrast, the Certificate Authority 140 is, preferably, an "air gap" computer (i.e., a standalone computer system isolated from a network).

Preferably, the mobile devices 110 include commercially available off-the-shelf mobile devices (including various smart phones and laptop computers) capable of wireless communication over conventional carrier networks. The requirements the mobile devices 110 must meet include that they have adequate computing resources, are programmed in accordance with preferred methods described herein, and that they be initially provisioned by either an already-provisioned Distributed C3i computer 120 or the Certificate Authority 140. For simplicity of exposition, only two mobile devices 110 are shown in FIG. 1; however, it is to be understood that, in practice, the present invention would preferably be able to support a large number of such mobile devices 110.

Preferably, the Distributed C3i computers 120 will include computers programmed in accordance with the preferred methods of the present invention and capable of mobile communication. As will be described in greater detail, a primary purpose of the Distributed C3i computers 120 is to manage the mobile devices 110 (and, in some cases) other Distributed C3i computers 120. Preferably, the Distributed C3i computers 120 exist in a configurable hierarchy, which can (but need not) be the same as the assigned trust hierarchy.

Preferably, the message broker 130 will include distributed servers programmed in accordance with the preferred methods of the present invention and capable of mobile communication. As will be described in greater detail, a primary purpose of the message broker 130 is to provide asynchronous communication among the components of the system. For example, the message broker 130 could act as an intermediary between a Distributed C3i computer 120 and mobile devices 100 it serves regarding additions or revocations to a contact list. Preferably, the Distributed C3i computers 120 and the mobile devices 100 do not have to be online at the same time during such contact list updating. In a preferred embodiment, the mobile devices 110 are able to "poll" the message broker 130 for any new messages; in alternative preferred embodiments, the message broker 130 is be able to "push" the message to the mobile device 110 in real time or near rear time (providing that the mobile device 110 supports such push messaging).

Preferably, the Certificate Authority 140 is a standalone computer system that serves as a "trusted third party". As will be described in greater detail, when a mobile device 110, a Distributed C3i computer 120, or a message broker 130 server is initially provisioned, part of the provisioning process involves signing the device's public key with an already-trusted key. The device then "inherits" trust.

Figure 2:
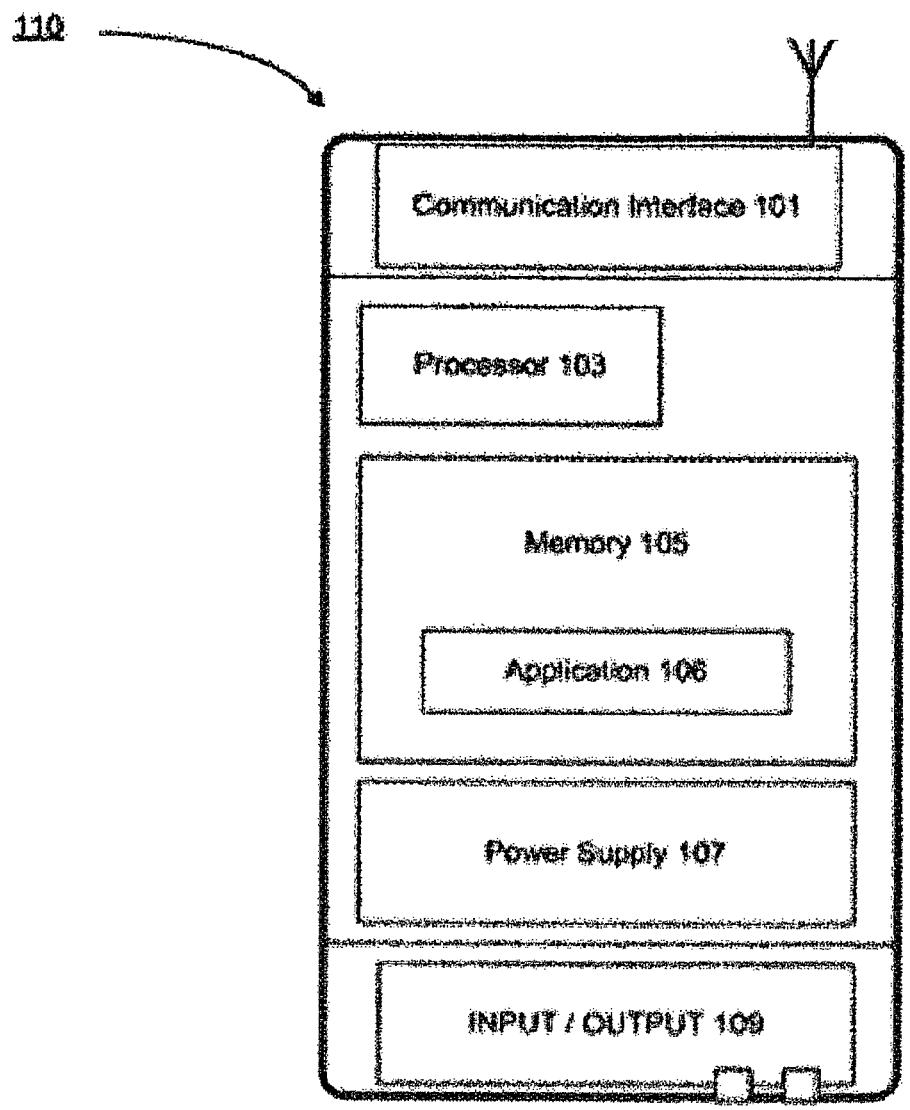
FIG. 2 shows a block diagram of an exemplary mobile device useable in conjunction with the present invention.

As noted, the mobile devices 110 can include various smart phones and laptop computers capable of communication over a public carrier network. FIG. 2 shows a block diagram of an exemplary mobile device 110 useable in conjunction with the present invention. Preferably, the mobile device 110 is a smart phone capable of wirelessly sending and receiving voice data packets via a wireless communication network (e.g., a cellular network) for voice communication, and which supports SMS text messaging and allows Internet access. As depicted, the mobile device 110 includes a communication interface 101, a processor 103, a memory 105 (including an application 106 stored therein), a power supply 107 (e.g., a lithium-ion battery), and an input/output 109 (e.g., one or more USB ports, a QWERTY keyboard/touch screen equivalent).

Representative mobile devices 110 useable in conjunction with the present invention include the BLACKBERRY line of smart phones by Research In Motion, Ltd, of Waterloo, Ontario; the iPHONE smart phones by Apple Computer, Inc., of Cupertino, Calif.; the DROID, RIZR Z8, RIZR ZIO, Q9c smart phones by Motorola, Inc., of Schaumburg, Ill.; the Palm line of smart phones, by Palm, Inc., of Sunnyvale, Calif.; the E51, E71, E72, E90 COMMUNICATOR, N82, N95, and N96 smart phones by Nokia. Corporation, of Espoo, Finland; the TOUCHPRO, TYTN, and TYTN II smart phones by HTC Corporation, of Taiwan; the GLOFISH X500 smart phone by E-TEN Information Systems Co., Ltd., of Taiwan; the CT810 INCITE by LG Corporation, of Seoul, South Korea; the BLACKJACK, OMNIA, SCH-1730, SCH-1760, and SCH-1900 smart phones by Samsung Group, of Seoul, South Korea; the LOBSTER 700TV smart phone/TV by Virgin Mobile, PLC, of London, United Kingdom; the IPAQ smart phone by Hewlett-Packard Company, of Palo Alto, Calif.; the PORTEGE G900 smart phone by Toshiba Corporation, of Tokyo, Japan; and the P990, W95oi, W960I, and XI smart phones by Sony Ericsson, of London, United Kingdom.

A notable feature of the present invention is that readily available devices can be used to ensure end-to-end encryption for secure transmission of classified information. Traditionally, National Security Agency (NSA) Type 1 devices were used for such purposes. However, such NSA Type 1 wireless communications devices are generally large, bulky, easily recognized and limited as to the particular wireless networks in which they can operate. Additionally, NSA Type 1 devices are expensive, non-discreet, and incompatible with the rapidly changing mobile handset market. The encryption scheme used here in is based on the peer-to-peer model. Advantageously, the present system can provide security at a very high level (including the secure transmission of classified information) but does not require any special purpose user communication devices. The only requirement is for a user of the system is to have a suitable device that has loaded in its memory software capable of (for initiating a call) and establishing an authenticated session, connecting with the caller, and performing the necessary steps of the encryption process. Additionally, and as will be described in further detail, the software, preferably, will be capable of negotiation regarding a call rendezvous point, relaying the rendezvous point information to the callee via an SMS message, and (for receiving the call) receiving the SMS message. Preferably, the application 106 includes software written for a supported mobile device 110 (such as a BLACKBERRY or APPLE smart phone).

In general, any information sent is sent directly to the recipient, encrypted so that only the recipient may read the information, and signed so that the recipient knows that the message came from the sender and was not tampered with while in transit. Preferably, the present invention uses certified strong encryption (e.g., Federal Information Processing Standard (PIPS) 140-2) to protect the confidentiality, authenticity and integrity of at least three types of communication from mobile devices: E-mail, Voice, and Text Messaging (SMS).

Authentication

Preferably, the application 106 provides a method for authentication of the user of the mobile device 110. Preferably, the user is prompted to provide a passphrase to unlock the private key associated with the mobile device 110. Preferably, a predetermined number of consecutive incorrect entries result in the mobile device 110 panicking, thus wiping all data. Preferably, the predetermined number of incorrect entries does not reset for each session, regardless of power loss. Additionally, preferably, the mobile device 110 remains unlocked while the user is actively using it; preferably, an inactivity timer re-locks the mobile device 110 when the application 106 is idle. Preferably, the user can also select a menu item to deliberately re-lock the device.

E-mail

Figure 3:
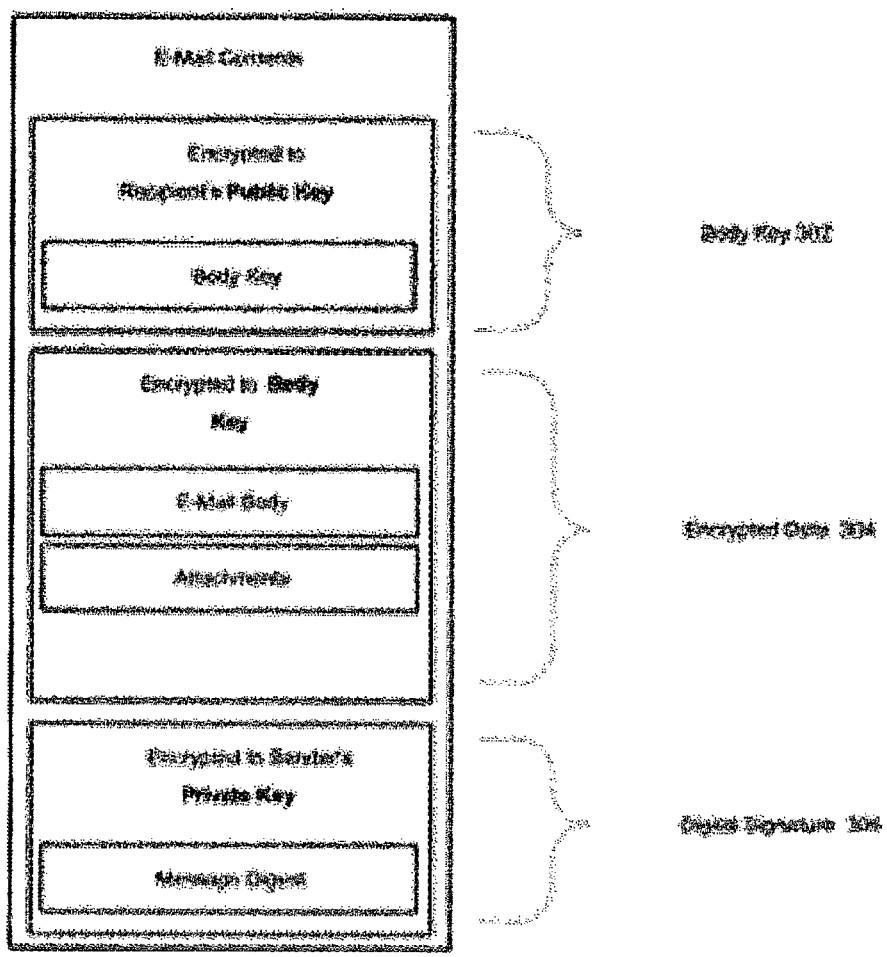
FIG. 3 shows an exemplary diagram of an e-mail message encrypted, according to preferred embodiments of the present invention.

Preferably, e-mail messages and attachments are encrypted following a strategy disclosed in the Network Working Group's Request for Comments (RFC) 3156, published August 2001, which is incorporated herein by reference. Referring to FIG. 3, the sending mobile device 110 generates a body key 302 for the e-mail and then asymmetrically encrypts that key with the recipient's public keys. Then, thee-mail message and any attachments are concatenated and encrypted with the body key, forming encrypted data 304. (The email body will preferably include the sender's fingerprint so as to foil a surreptitious forwarding attack). Finally, a digital signature 306 is generated. The resulting trio of structures is placed into an e-mail message, as shown in FIG. 3, and sent to the intended recipient. The recipient mobile device 110 uses the digital signature 306 to validate that this email was sent by a legitimate, authorized device, and then decrypts the body key 302, and finally decrypts the email body and attachments. The digital signature 306 also provides non-repudiation, guaranteeing that this e-mail was sent by the sender, not an adversary.

Voice

The encryption schemes described herein with regard to voice and text messages (SMS) are based upon the Station-to-Station (STS) protocol. See, Diffie, W.; van Oorschot, P. C.; Wiener, M. J. (1992), "Authentication and Authenticated Key Exchanges", *Designs, Codes and Cryptography*, which is incorporated by reference. However, it is to be appreciated that another suitable asymmetric signature algorithm could be used. Furthermore, it is to be understood that the parties can negotiate a mutually agreeable scheme during the initial handshake.

Bypassing the IP PBX

In a typical mobile network, location registers are used to determine the location of a mobile device for paging during a voice call setup. Similar entities are used in mobile IP to locate devices for, data calls. As with mobile voice and data, a typical mobile VoiP deployment requires a directory service to determine VoiP subscriber IP addresses.

According to preferred embodiments of the present invention (disclosed in more detail in co-pending U.S. patent application Ser. No. 12/916,522, entitled "Technique For Bypassing an IP PBX", by Patel et al., filed on Oct. 30, 2010, which is herein incorporated by reference), a secure server is configured to assign and provide to the caller's communication device a unique address (IP address/port) of a proxy. The caller's device then sends a Short Message Service (SMS) text message to the callee's device with the assigned address of the proxy. Thereafter, the caller and the callee connect at the assigned address of the proxy, thereby forming a communication path.

Figure 4:
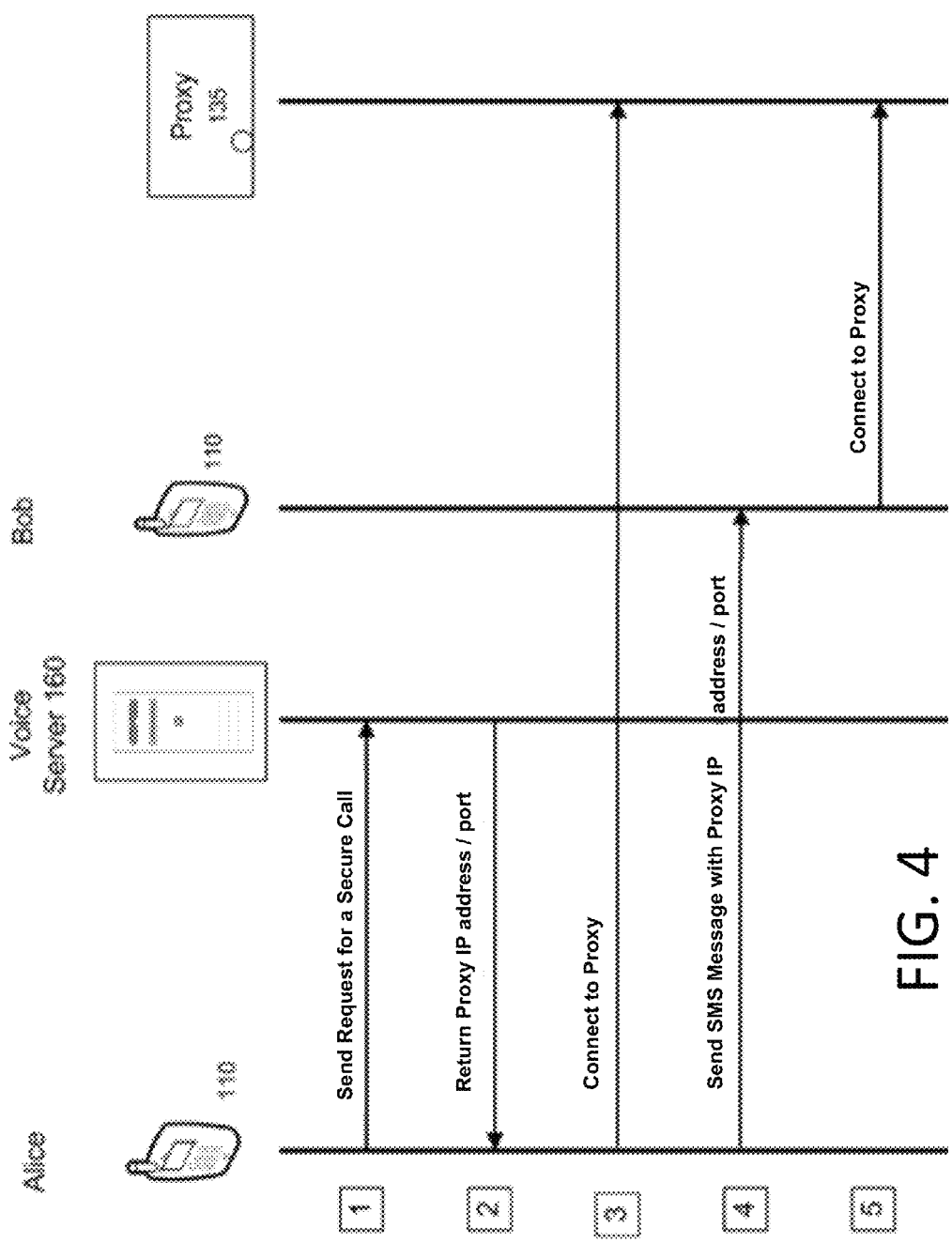
FIG. 4 shows an exemplary sequence diagram illustrating an example of a technique for bypassing an IP PBX, according to preferred embodiments of the present invention.

Referring to FIG. 4, a sequence diagram illustrates an example of the technique for bypassing an IP PBX.

As shown in FIG. 4, initially, (step 1) Alice's mobile device 110 sends a request to the Secure Server 130 to initiate secure communication.

Then, (step 2) after Alice is authenticated by the Secure Server 130, Alice is provided by the Secure Server 160 with an IP address and a port where it has made a proxy 135 available that listens for incoming voice connections.

Then, (step 3) Alice's mobile device 110 connects to the provided IP address and port.

Next, (step 4) Alice sends an SMS message containing the LP address and port of the proxy that was provided to it by the Voice Server, and an authentication token, to Bob.

Finally, (step 5) using the authentication token, Bob authenticates Alice then proceeds to connect to the proxy's IP address and port. Because both Alice and Bob are now connected to the same IP address and port, a communication path can be established between Alice and Bob.

Advantageously, this technique does not require (persistent) storage of the IP address of the mobile device 110 of either party on any component of the network. Moreover, Alice never obtains the IP address of Bob, and the Bob never obtains the IP address of Alice. Furthermore, if the Secure Server 160 itself is compromised, the only information available would be the IP addresses of the current users of the server. In any case, once it is determined that the Secure Server 160 has been compromised, any identifying information will be automatically flushed. Because the Secure Server 160 does not require a location register, it does not have information as to every user of the system. Moreover, interrogation of any of the communication devices would not yield the IP addresses of persons for whom calls were made. This is accomplished because the technique described herein does not require the IP address of the other party.

SMS/Text Messaging

Text messaging (or Short Message Service) is a popular protocol for sending short messages between mobile devices. However, these messages are sent over a wireless network via plain text and are susceptible to both intercept and tampering. Encrypting these messages securely is complicated by their small maximum size. In a simple cryptographic implementation, it would take two text messages to send the encrypted equivalent of one. The present invention mitigates this issue by treating text messages as a kind of Instant Messaging session between two devices, simplifying the common case of two mobile device 110 users having a "conversation", while not causing excessive data overhead if the message needs no reply or discussion.

Figure 5:
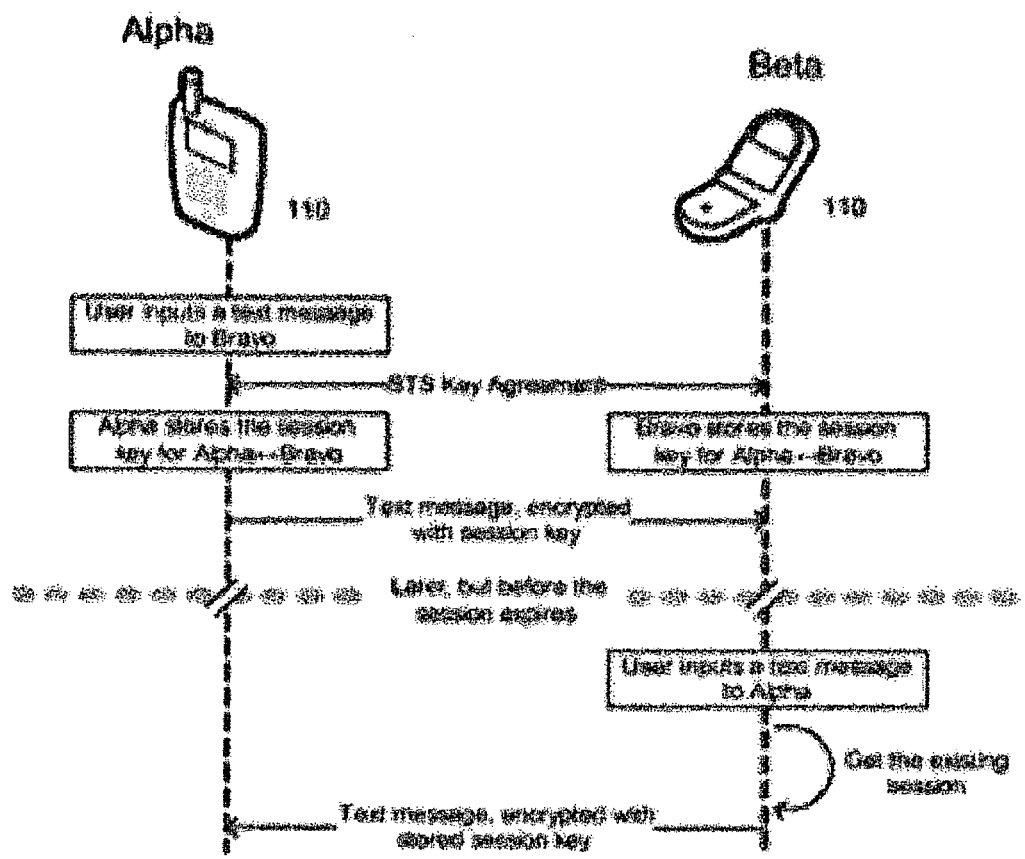
FIG. 5 shows an exemplary flow chart illustrating the steps for encrypting an SMS texting session, according to preferred embodiments of the present invention.

Referring to FIG. 5, text messaging encryption operates in a similar manner to voice communication; they both consist of many "messages" between parties. However, because of the limited size of SMS messages, certain of the encryption steps are broken into multiple SMS messages.

Once a session key is established between peers, it is used until it either expires or one of the peers chooses to discard via a menu option. Once the key is discarded for whatever reason, subsequent messages simply start a new session by deriving a new session key just like before. This strategy, in addition to minimizing SMS overhead for the encrypted messaging, also provides perfect forward secrecy: even if one of the mobile devices 110 is compromised in the future, any previously-wiretapped SMS conversations held will remain secure. Finally, this strategy provides non-repudiation.

User Interface/User Experience

Preferably, the mobile devices 110 are unmodified commodity devices, each such mobile device 110 having an application 106 installed in its memory 105. Because the mobile devices 110 will include a variety of brands with different hardware and operating systems, the application installed on the particular mobile device 110 will have to be configured to work on that particular device. In general, to the extent possible, the application 106 will be integrated into the supported device's operating system. Furthermore, preferably, when the mobile device 110 starts, it automatically opens the application 106 as a background application, where it retrieves the current contact and key revocation lists. At some later point, the user can open the application 106 (such as by selecting the application icon) and select the "Encrypt and Send" menu option to start the encryption process, for example.

Configuring the Devices, Adding Users to an Enclave

Figure 6:
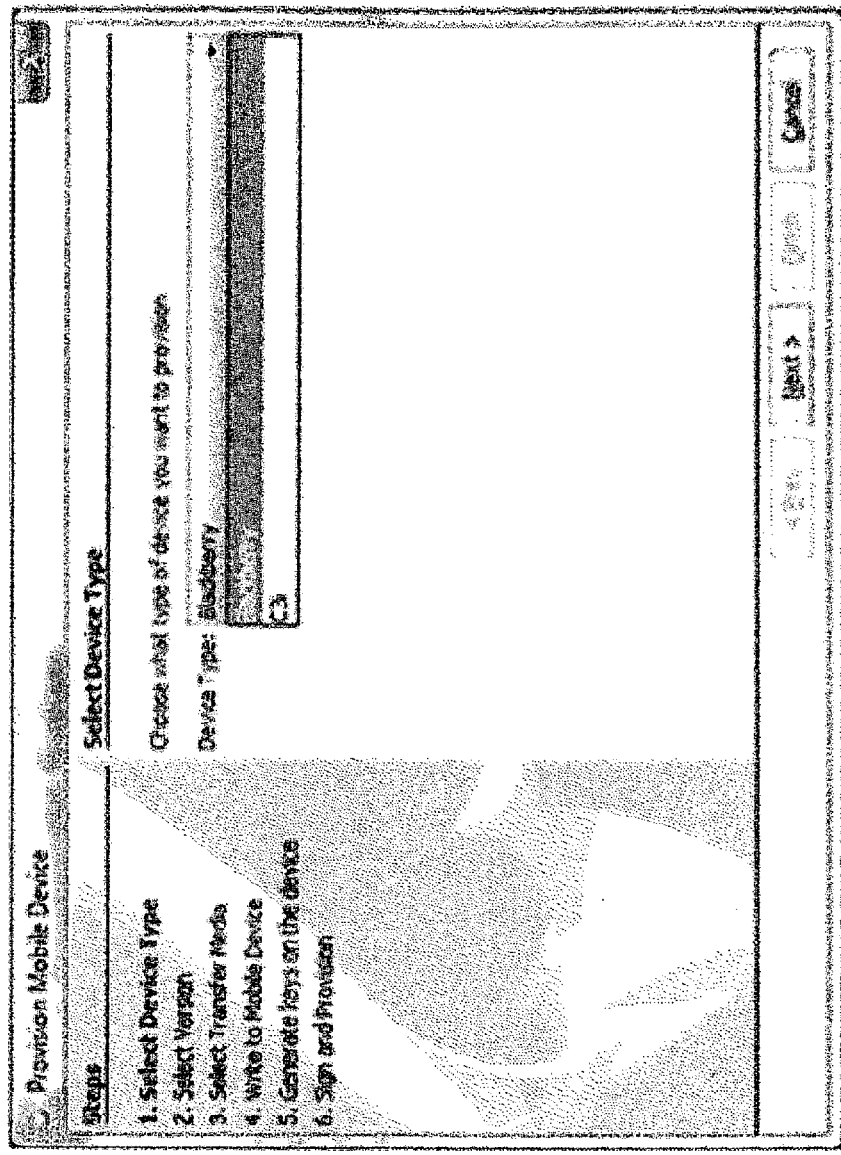
FIG. 6 shows an exemplary main menu screen for provisioning a mobile device; according to preferred embodiments of the present invention.

Preferably, the ability to provision devices and manage users can be facilitated with intentionally engineered setup wizards targeting the experience level of the particular user base. For example, someone operating the Distributed C3i computer 120 may have specific skills and knowledge which differs from the user of a mobile device 110. Therefore, the wizards are to be designed accordingly and with human factors in mind. An example of screenshot of an exemplary device provisioning wizard is shown in FIG. 6.

Concept of Operation

Preferably, a user purchases a compatible mobile device 110, and brings it to a Distributed C3i computer 120 for provisioning. After provisioning, the Distributed C3i computer 120 assigns the user to one or more contact groups for their mission. The user then has an mobile device with which to receive and send sensitive but unclassified intelligence and instructions. Once complete, the mobile device 110 can be reassigned or wiped and discarded.

Preferably, there can be at least three ways the mobile device 110 can panic: tamper induced, operator induced, and remote revocation. If the user of an mobile device 110 believes it is about to be compromised, the user can press a special key combination which will clear the encryption keys, send notification of the panic, and then wipe all data from the mobile device 110. Additionally, if a device 110 is unlocked incorrectly a configurable number of times it panics on its own. Other means of authentication are available, i.e. multifactor authentication and have been considered in the architecture (e.g. CAC Card Readers, various recognition biometrics, etc.). In alternate embodiments of the present invention, an mobile device 110 may also be wiped remotely.

Multimedia and Types of Intelligence Supported

Preferably, the present invention supports multimedia such as images, video clips, and documents which can all be encrypted and sent via e-mail. Additionally, each supported mobile device 110 has integration with its operating system to allow users to send such multimedia quickly. For example, a user might be able to snap a photo, press the Menu key, and then select "Encrypt and Send" to open the application 106, create a secure email, and attach the photograph all in one step. Potentially any type of file may be encrypted and sent; the only limitations are platform-based. For example, some brands of smart phones currently only support recording and playing back certain types of video.

Trust Revocation

One of the primary tasks of the message broker 130 is to provide secure, signed "revocation lists" to each device 110 on a regular basis. A revocation list is a listing of previously trusted device keys that should now be treated as hostile.

Devices will be compromised: phones are stolen or forgotten every day. Even the message broker 130 and the Distributed C3i computers 120 are targets for attack; as such, any device key may be revoked.

Uncompromised devices will not allow communication using revoked keys. Once a device's key is added to the revocation list, no new messages may be sent to the device, and no messages from the device will be accepted. Any communication sessions that were in progress will be halted as quickly as possible after the updated revocation list is distributed. Where possible, revocation lists are "pushed" immediately to devices.

Contact Groups

Figure 7:
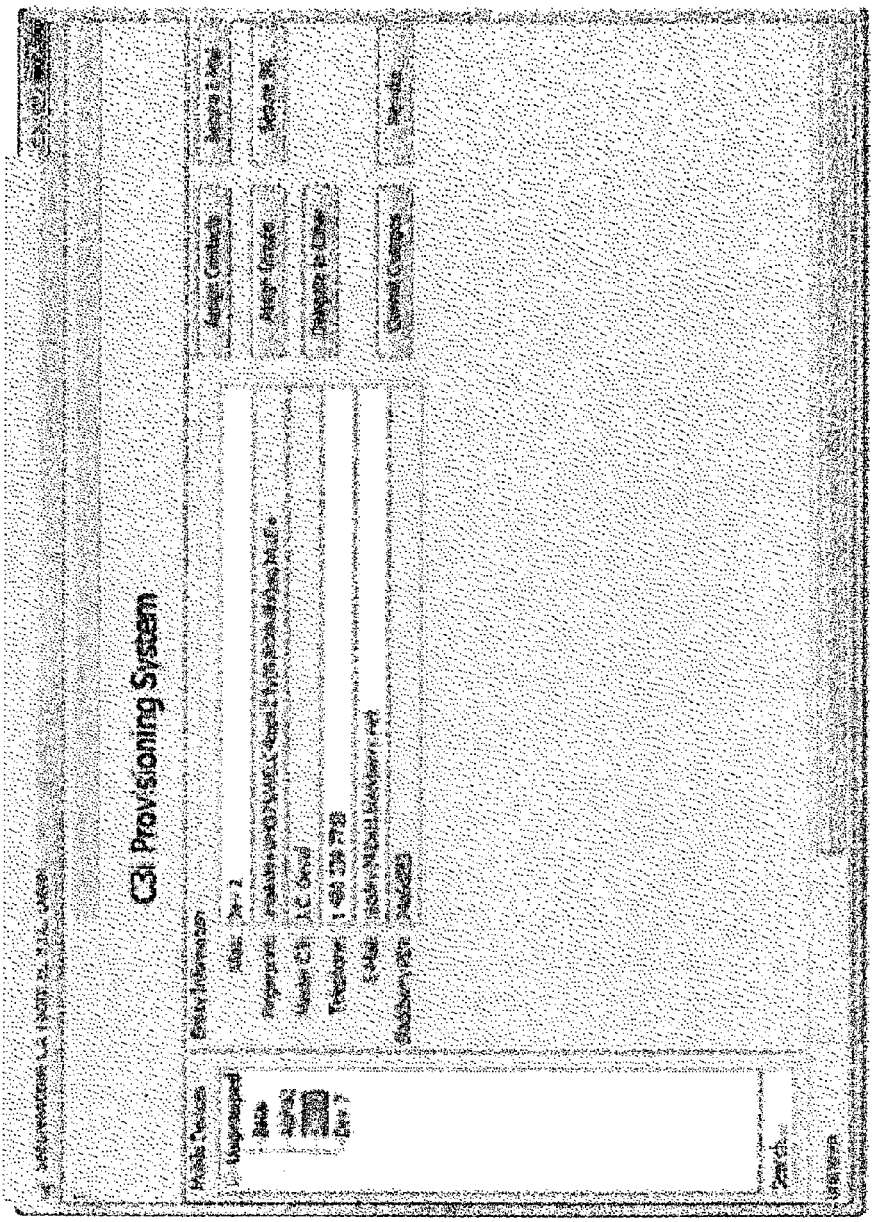
FIG. 7 shows an exemplary screen for assigning contacts to a mobile device; according to preferred embodiments of the present invention.

Everyone is used to mobile phones having a contact list. The present invention adds a parallel, shadow, secure-only contact list that is managed by the Distributed C3i computers 120. Each mobile device 110 is assigned its own unique contact list, and this list can be any combination of individual peer mobile devices 110 or groups of those peers. Preferably, these lists are updated in near-real-time, and all changes will propagate quickly throughout the network. Preferably, contacts are identified by an alias, a mobile device phone number, a mobile device email address and a signed, trusted public key. Preferably, aliases can also change on-the-fly. FIG. 7 shows an exemplary screen useable for a Distributed C3i computer 120 to assign contacts to a user's mobile device.

Group Communication/Multicast

Preferably, in addition to sending messages peer-to-peer, the mobile devices 110 can also send encrypted messages to multiple peers at the same time using the secure e-mail feature. The e-mail body is still encrypted with AES, but the session key is asymmetrically encrypted individually to each recipient, allowing each to read the secure message.

Device Management

Preferably, the Distributed C3i computers 120 manage the addition and revocation of other devices into the network, and also manage the contact lists and configuration options of each provisioned mobile device 110. Preferably, each Distributed C3i computer 120 has a set of devices it can natively manage: these are typically the devices it has directly provisioned. Additionally, the Distributed C3i computer 120, preferably, can manage other devices that have been delegated to it, allowing for multiple Distributed C3i computer 120 to manage a given device concurrently.

Figure 8:
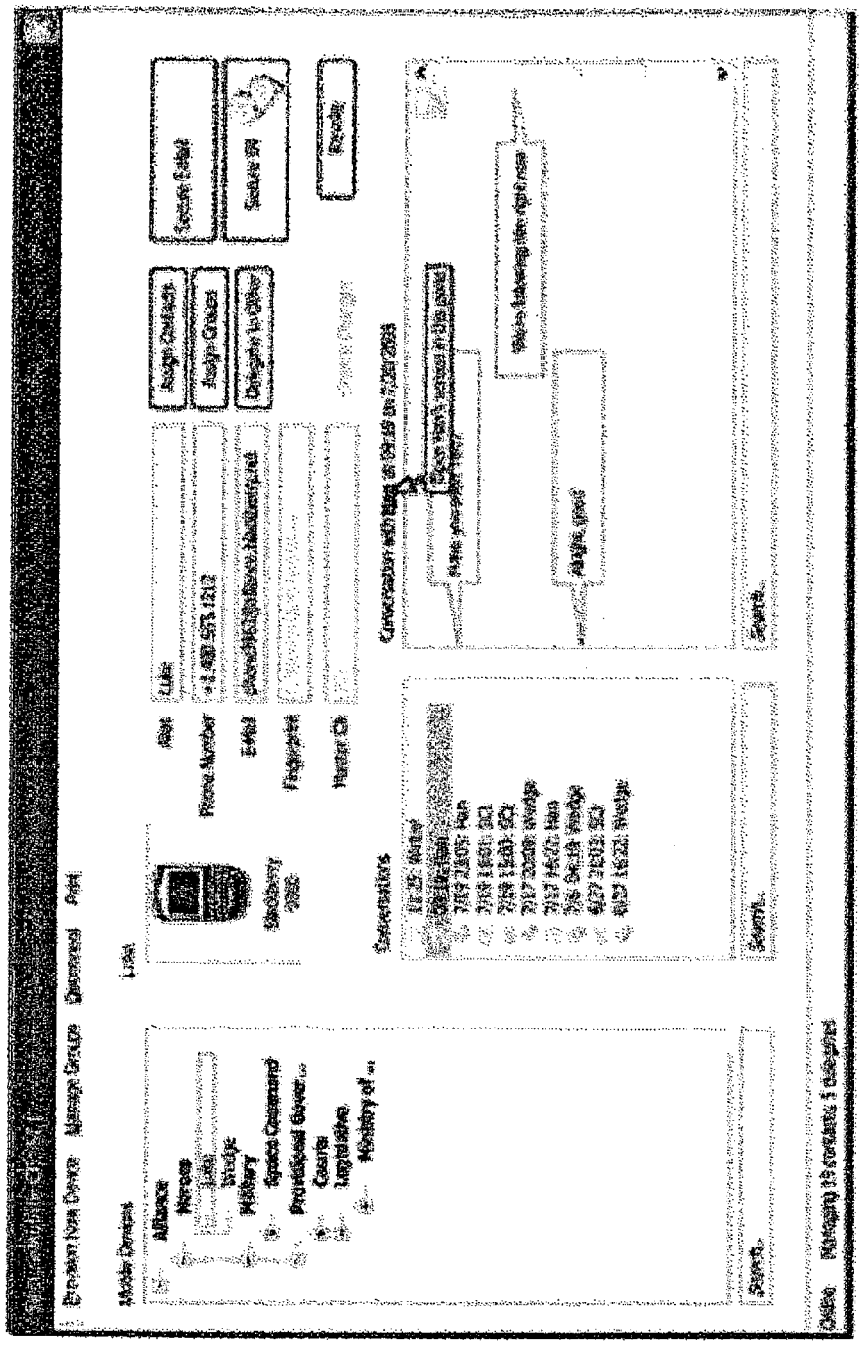
FIG. 8 shows an exemplary screen for managing mobile devices with auditing features enabled, according to preferred embodiments of the present invention.

Preferably, management of an mobile device 110 includes assigning groups and contacts to the mobile device 110, being able to revoke its key, and, auditing its communications. Preferably, the Distributed C3i computers 120 can also securely communicate with the mobile devices 110 through the secure e-mail and text messaging functions described above. FIG. 8 shows an exemplary screen useable for a Distributed C3i computer 120 to manage mobile devices 110, with the auditing features enabled.

Preferably, the Distributed C3i computers 120 exist in a configurable management hierarchy. The management hierarchy is independent of the trust hierarchy, and, while the two can be the same, they do not have to be.

Figure 9:
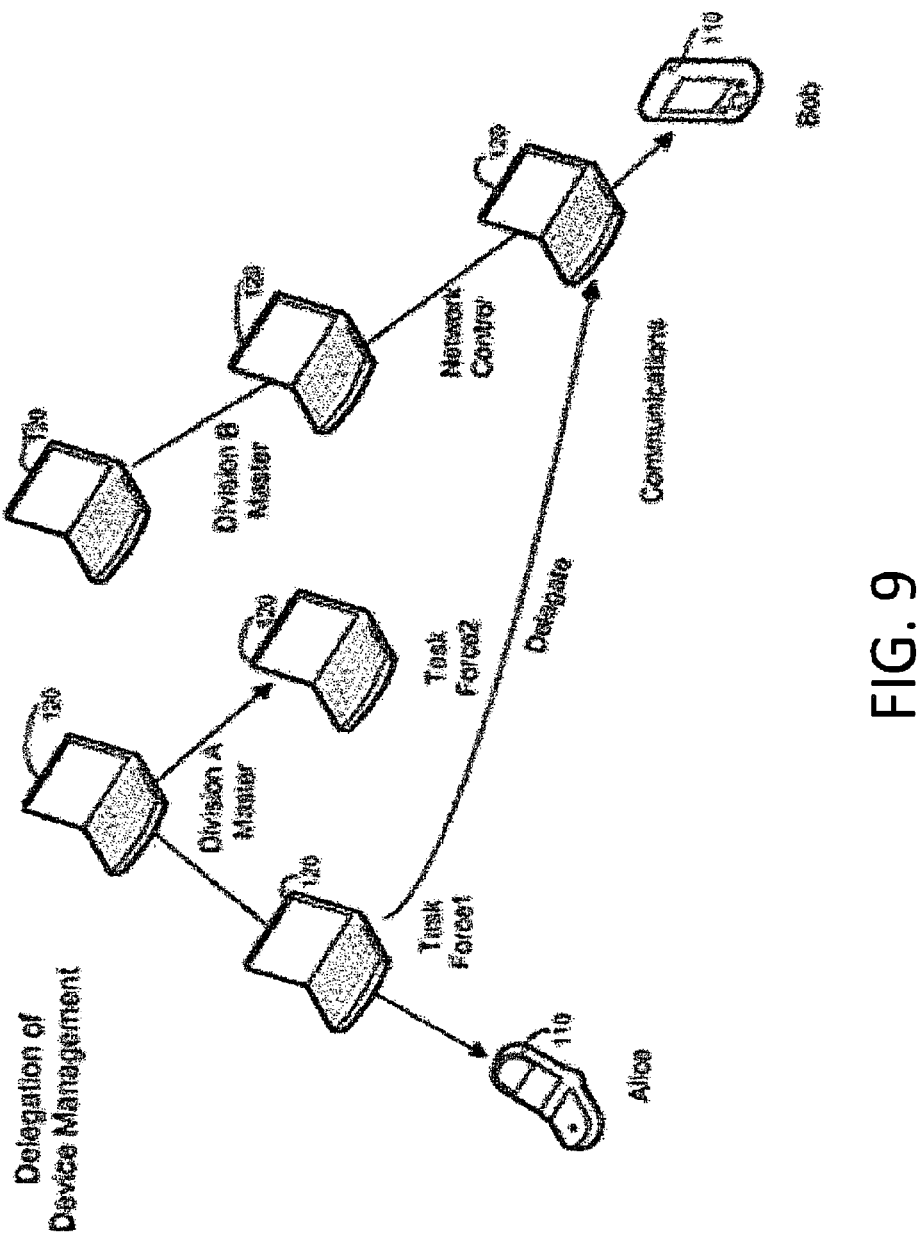
FIG. 9 shows an exemplary device management hierarchy with independently managed divisions, according to preferred embodiments of the present invention.

FIG. 9 illustrates an exemplary management hierarchy with two completely independently managed divisions, "A" and "B". In the general case, no mobile device 110 provisioned by any Distributed C3i computer 120 within the Division "A" structure can be manipulated by Division "B"; they are separate "enclaves." While they both exist within the hierarchy, they are effectively autonomous.

The management hierarchy was designed with the understanding that collaboration is a major virtue, even in secure systems. For that reason, the present invention adds an additional feature that is not seen in conventional hierarchical device management schemes: the ability to delegate device management across enclaves without the need for a "super user" with ultimate control at the top, as such master controllers tend to make inviting targets for adversaries.

In the scenario shown in FIG. 9, Division "A" and Division "B" are completely separate top-level users (though they share the same root Certificate Authority 140), with two mobile device 110 users who need to communicate. Since there is no "super user," one of the Distributed C3i computers 120 is allowed to manage. As shown, Alice generates a Delegate Device message containing Alice's contact list and security certificates and sends it directly to the delegate, in this case the "Communications" Distributed C3i computer 120 belonging to the Division "B" Network Control. This Delegate Device message contains all the information another Distributed C3i computer 120 needs to modify the mobile device's 110 contact list and add the delegated mobile device 110 to the contact list of any mobile device 110 it manages. Again, this message can be sent to any member of the network, allowing for the potential of inter-company, inter-agency or inter-service secure communication. These delegations can be cancelled at any time.

Audit Capabilities

As disclosed herein, the systems and methods of the present invention employ a variety of peer-to-peer, off-the-grid encryption techniques. However, third party auditing of encrypted communications is also available. Toward this end, preferably, a Distributed C3i computer 120 can configure individual mobile devices 110 to use a specific Distributed C3i computer 120 as an auditor. From that point on, the mobile device 110 will encrypt and copy each of its communications directly to the auditing Distributed C3i computer 120. This allows users to perform audits, but avoids the security issues of having a single point of failure with all of the plaintext communications.

Message Broker

Though the Distributed C3i computers 120 perform command and control functions for the mobile devices 110, they cannot contact the mobile devices 110 directly. Furthermore, the mobile devices 110 and Distributed C3i computers 120 will often only be transiently available, yet need a means to communicate between each other. For this reason the present invention employs a version of an asynchronous enterprise messaging service as a communications middleware between the Distributed C3i computers 120 and the mobile devices 110. In a preferred embodiment, the mobile devices 110 are able to "poll" the message broker 130 for any new messages; in alternative embodiments, the message broker 130 is be able to "push" the message to the mobile device 110 in real time or near rear time (providing that the mobile device 110 supports such push messaging).

Figure 10:
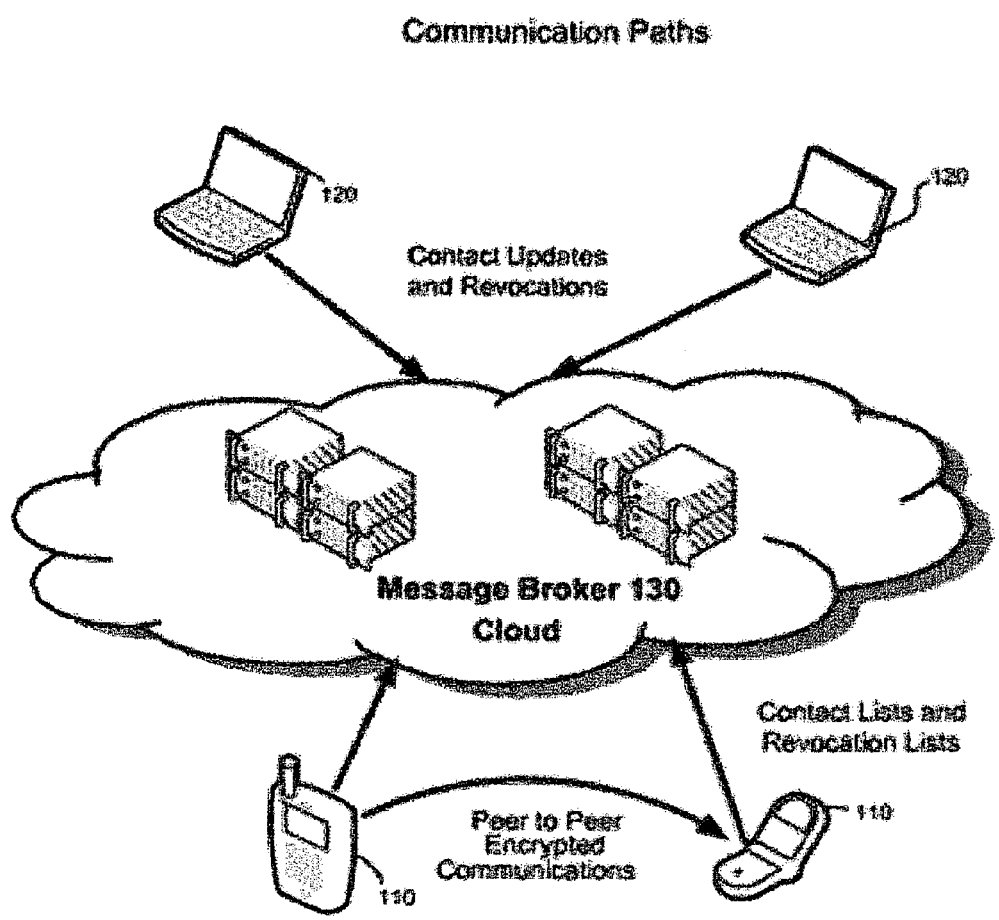
FIG. 10 shows an exemplary diagram illustrating the message broker as conceptually being a message broker cloud, according to preferred embodiments of the present invention.

Referring to FIG. 10, the message broker 130 may be conceptually treated as a cloud; the message broker 130 exists on the Internet 180 and utilizes proven enterprise technologies to provide message durability, guaranteed delivery, and fault-tolerance. (Preferably, Hornet Q by Jboss (a Red Hat open source product) can be used to implement the asynchronous messaging system for the message broker 130.) Preferably, the message broker 130 employs the same techniques as the rest of the system, however, while the message broker 130 holds encrypted messages, it does not have the decryption keys needed to decrypt the encrypted messages.

Mobile Device Configuration

Preferably, many features of the system can be configured on a per-device basis by the Distributed C3i computers 120. Preferably, configuration data can be downloaded to the mobile devices 110 in the same signed, encrypted data package as the contact lists. Preferably, the configurable options include:

number of allowed authentication failures before the device panics whether the system should prompt the user to delete e-mail messages after being read how long SecureMobile should be allowed to be idle before re-locking how long an SMS or Voice "conversation" key should be allowed to last before expiring.

Securing the Mobile Devices

As discussed above, the mobile devices 110 preferably use strong encryption to protect communications. Accordingly, few adversaries will be able to attack the communications security directly. Instead, the mobile devices 110 themselves could be attacked. However, several features of the present invention make it difficult to do so successfully.

Data Storage

Strong communication encryption means nothing if the encryption can be bypassed by stealing a suitcase or breaking into a hotel room. As such, care is taken to minimize the data available to an adversary if they acquire an "at rest" mobile device 110.

All incoming e-mail messages are stored only in their encrypted form. If the mobile device 110 is locked, the adversary would have to attack the private key's passphrase to read the message. Only if the mobile device 110 is unlocked and in-use at the time it is compromised would the attacker be able to read the messages. For additional security, the mobile devices 110 can be configured to securely delete messages immediately after being read.

Incoming text messages are only readable for a limited time, because the mobile device 110 does not store the session key in long-term storage. Additionally, even the complete compromise of a private key of an mobile device 110 would not enable an adversary to read old text messages due to having the property of Perfect Forward Secrecy.

Voice calls do not store any persistent data, and each call uses a unique session key of the exact same sort as is generated for text messages. Voice calls also have Perfect Forward Secrecy.

Attachments to secure e-mail are somewhat more problematic. While the attachments are encrypted with the e-mail, in order to view the attached data they must be decrypted and saved to persistent storage in their unencrypted form. This is a liability in the event that any secure data is saved to the device and forgotten. To mitigate this risk, when a user deletes a secure e-mail which had attachments, the system prompts the user for permission to securely wipe those saved attachments from persistent storage. Additionally, other security measures can be employed on supported devices, such as memory card encryption on the Blackberry platform.

Panic

If a user of an mobile device 110 knows that his device is about to be compromised, he or she can discretely initiate a panic mode without needing to first unlock the device's private key. The exact mechanism for this varies from device to device, and is customizable. For example, the side buttons on a Blackberry handheld can be configured such that if they are both pressed for a few seconds ("squeeze" the phone), the device panics.

Once the mobile device 110 panics, many things happen quickly:

1. The master private encryption key is quickly wiped.
2. Any active session keys (voice or text messaging) are quickly wiped.
3. Any saved, formerly-encrypted attachments are quickly wiped.
4. A panic notification is sent to the message broker 130.
5. If so configured, particular file types on the data card are quickly wiped.
6. If so configured, the data card is quickly wiped.
7. All secure e-mail messages are quickly wiped.
8. All secure text messages are quickly wiped.
9. Steps 1-8 repeat, this time performing full data wipes.
10. Step 9 repeats until the device loses power.

On phones or other mobile devices equipped with solid state media, the quick wipes are simply overwriting the data (e.g., with all zeroes). While such a quick operation is insufficient to avoid data recovery on magnetic media, it is sufficient with solid state flash media to disable any nonintrusive data recovery technique. (A caveat: Flash media performs hardware-level "wear leveling," where a write to an existing byte of data may actually be stored in a different part of the memory chip than the original byte. This is a security risk; however, recovering the original data bytes after being wear-leveled requires a clean room disassembly of the flash disk and a state history trace of the particular wear leveling algorithm in use by the microcontroller. Additionally, the wiping algorithm is preferably repeated for as long as possible; statistically, the hardware wear-leveling will eventually overwrite the true data locations.)

On devices with magnetic media, a quick wipe is a complete pass of writing pseudorandom data over the sensitive data. The full wipes on both types of media follow the NIST Guidelines for Media Sanitization, disclosed in *Special Publication* 800-88: *Guidelines for Media Sanitization*, which is herein incorporated by reference.

Remote Wipe

When a new revocation list is sent to each mobile device 110, if that device is listed as revoked, the device immediately panics just as if its user initiated the panic locally. This method is most effective against unsophisticated adversaries, such as thieves. Sophisticated adversaries may remove the battery or place the device in an emissions control enclosure (such as a Hoffman box). This method is not time sensitive; if a compromised phone's battery is not replaced in the device until several months later, upon boot-up the application will recognize the device as being revoked and immediately panic.

Boot-Up Scenario

As mentioned, preferably, the application 106 loads automatically on each mobile device 110. Once loaded, the application 106 immediately checks-in to the message broker 130. If the message broker 130 does not recognize the device, either due to a revocation or because the device is counterfeit, for example, the mobile device 110 can be configured to immediately panic. Otherwise, the device 110 downloads the most recent contact and revocation lists in an encrypted format for use when the user later opens the application 106.

Passphrase

When the user opens the application 106, the application 106 checks to see if the private key of the device 110 is unlocked (decrypted) and ready for use. If it is not, the user is prompted to enter their passphrase to unlock the key. Once unlocked, the key automatically re-locks after a configurable timeout. If the user enters an incorrect passphrase several times, the device 110 panics. This number of attempts is persistently stored, so that simple attacks like removing the battery between passphrase entries will not permit additional attempts. Preferably, the number of allowed attempts is configurable. Preferably, the private key is encrypted using a 256-bit AES key generated by a Passphrase Based Encryption (PBE) technique. Preferably, the PBE technique uses 1500 rounds of salted SHA512 hashes to generate the AES key. Preferably, there is no other mechanism to decrypt a private key of a device 110; audit functionality is optionally available and is described above.

Timeout of Keys

Preferably, all keys in the system are given expiration dates, including the private keys of the device 110. Preferably, these expiration dates are configurable at the time the keys are generated. If any device's private key expires, the device behaves as if its key were revoked. Expired session keys are not accepted for secure communication.

Trust Management

Trust is an extremely important part of any cryptographic system; strong encryption between peers provides no security if one of the peers is actually an adversary.

Establishing Trust

Figure 11:
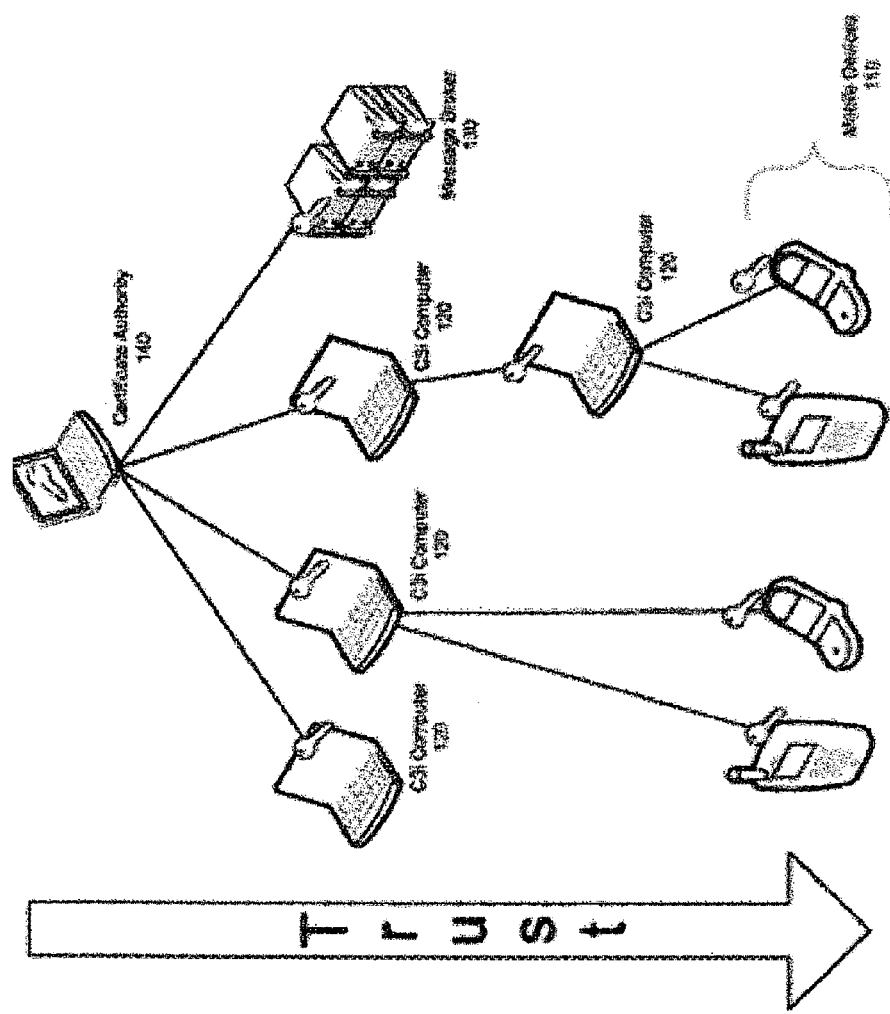
FIG. 11 shows an exemplary tree graph illustrating the flow of trust, according to preferred embodiments of the present invention.

The present invention follows a Trusted Third Party structure, where the Third Party is an ultimately-trusted Certificate Authority; this is how trust is provided on Internet web sites, typically with the Third Party being Thawte, VeriSign, etc. In this structure trust flows "downward" from the Certificate Authority in a kind of tree graph, shown in FIG. 11. Verification of trust then proceeds in an "upward" direction every time two devices begin communicating; trust is only established if each device can cryptographically verify that its peer has a trust "path" all the way to the Certificate Authority.

Figure 12:
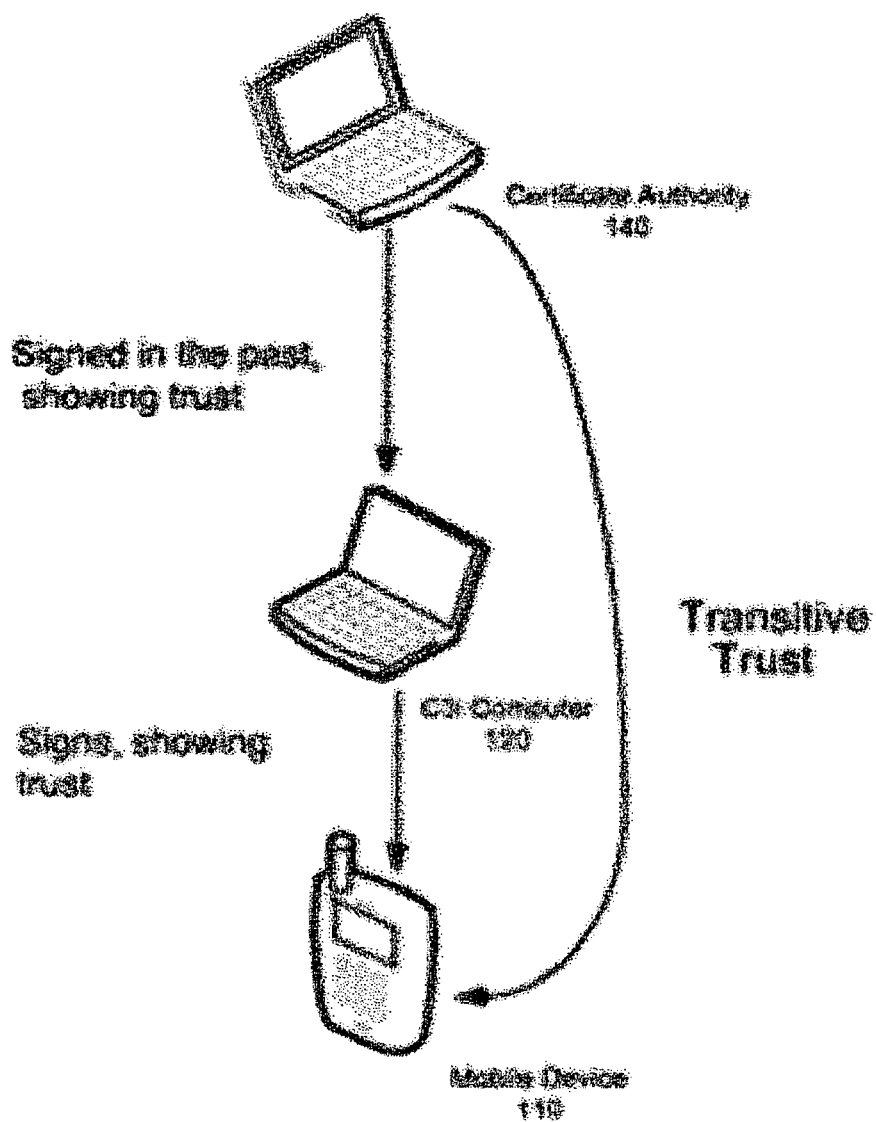
FIG. 12 shows an exemplary diagram illustrating a mobile device inheriting trust through the transitive property, according to preferred embodiments of the present invention.

Preferably, when an mobile device 110 is initially provisioned, part of the provisioning process involves signing the public key of the mobile device 110 with an already-trusted key. The mobile device 110 then "inherits" trust through the transitive property. An example in FIG. 12 shows a simple scenario: the Certificate Authority 140 has signed the public key of a Distributed C3i computer 120 and thus testified that it is legitimate, and the Distributed C3i computer 120 is now signing the new public key of the mobile device 110, testifying that it in turn is legitimate.

Figure 13:
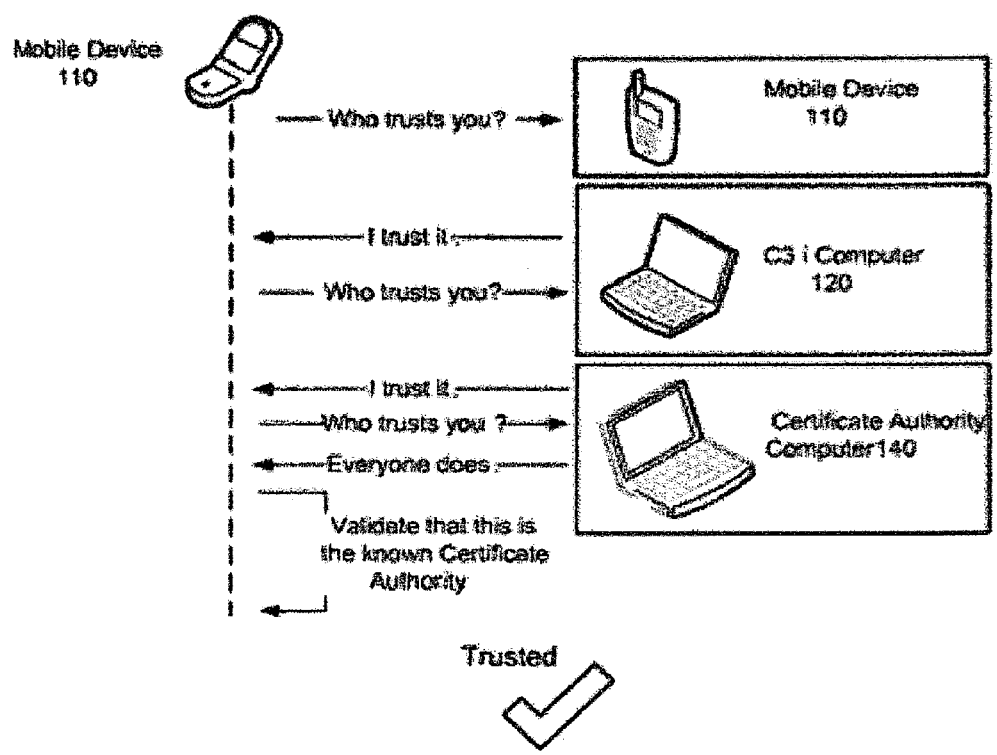
FIG. 13 shows an exemplary diagram illustrating trust verification, according to preferred embodiments of the present invention.

Preferably, later, when the new mobile device 110 sends an encrypted e-mail to a peer, both sides perform "trust verification" on each other before encrypting or decrypting the message. This is a recursive operation where each side (essentially) asks the questions, "Who trusts you?" and "Who trusts him?" until it reaches the known Certificate Authority 140. If each side can prove the other has a line of trust, unbroken by revocations, between it and the known Certificate Authority 140, then it is trusted. FIG. 13 illustrates an example of this verification process.

Trusted Third Party strategies such as this are only as trustworthy as the Certificate Authority. For this reason, the Certificate Authority 140 is subject to stringent physical security, and, preferably, is not allowed to be connected to another computer or computer network (i.e., is an "air gap" device).

Maintaining Trust

When devices are compromised, their device keys are revoked by one of the computers that originally trusted that device. This breaks the chain of trust used for verification, isolating that device and any devices it had signed.

Figure 14:
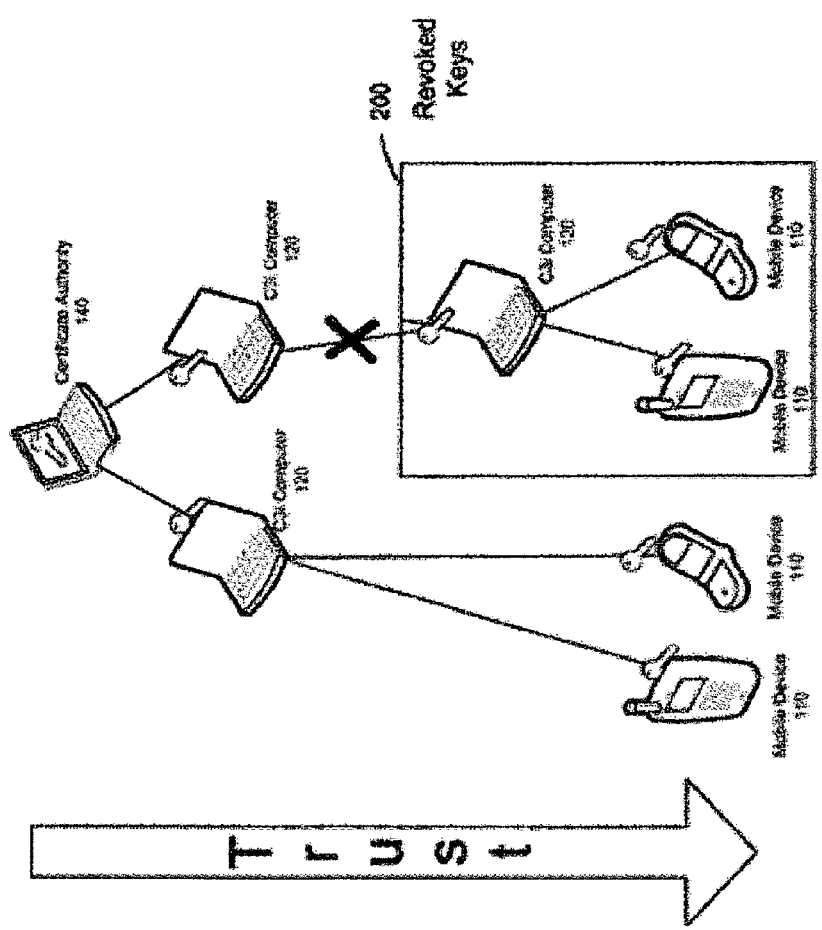
FIG. 14 shows an exemplary tree graph illustrating revocation of trust keys, according to preferred embodiments of the present invention.

When the compromised device is a mobile device 110, this is straightforward: the mobile device 110 can no longer participate in the network. However, the message broker 130 and the Distributed C3i computers 120 are somewhat more complex to visualize. If we return to the "tree of trust" concept, revoking a device's keys revokes that device and every device directly underneath it (for example, FIG. 14 shows the devices with revoked keys 110).

While this is potentially an expensive type of vulnerability, it's not necessary for a Distributed C3i computer 120 to provide the trust relationship for the mobile devices 110 it administrates. In fact, the architecture is very flexible on this matter.

Many trust/command hierarchies are possible within the present architecture, some of the preferred ones include:

One Distributed C3i computer 120 could provide trust to each mobile device 110 in a "group" and be kept in secure storage, while other Distributed C3i computers 120 are used actively.

Each Distributed C3i computer 120 could manage a small number of mobile devices 110, limiting the compromise exposure.

All mobile devices 110 could be signed directly by the Certificate Authority 140.

Provisioning

Preferably, upon start-up of a mobile device 110 and periodically during operation, the system connects to the message broker 130 to receive configuration data, the contact list, and the most recent revocation list. Preferably, the network connection between the mobile device 110 and the message broker 130 is secured with Transport Layer Security. Preferably, the mobile device 110 is provided with assurance that the message broker 130 is legitimate through trust path verification. The message broker 130 has no assurance that the mobile device 110 is legitimate at this time. (Since the mobile device 110 performs this provisioning immediately upon start-up, there is a strong likelihood that the private key of the mobile device 110 is still locked. When the private key is "unavailable," the device cannot prove anything about itself.)

Preferably, the mobile device 110 provides the message broker 130 its device key fingerprint: a secure hash of its public key. Preferably, if the mobile device 110 provides an improper key fingerprint, the server immediately terminates the connection. Otherwise, preferably, the server then looks up the device's encrypted contact list and configuration parameters. Preferably, then the server provides the most recent revocation list, the encrypted contact list and the encrypted configuration parameters to the mobile device 110.

Preferably, the revocation list is not sent encrypted so that even if a private key of the mobile device 110 is locked, it can immediately validate the authenticity of the revocation list and process it. If its own key is listed, the device panics. Otherwise, the list is stored to be consulted during trust path validation. Then the mobile device 110 stores the encrypted contact list and configuration data so that it's ready for the user the next time the application 106 is opened and unlocked.

Preferably, while the revocation lists are not encrypted, they are signed by the Distributed C3i computers 120 that generate them, and thus they are validated as being unmodified in transit.

Preferably, a mobile device 110 at rest downloads its provisioning data (contact list, revocation list, configuration data) from the message broker 130 at predetermined intervals (e.g., once every 50-70 minutes), generated by a uniform pseudorandom number generator. When the mobile device 110 is turned on from a powered-off state, it downloads this information as soon as it can and then starts the randomized timer. Preferably, if the mobile device 110 cannot retrieve the provisioning data within several (e.g., three) attempts at its scheduled time, it resets its timer to a new random (e.g., 50-70 minute) value and repeats. Preferably, it is configurable how mobile devices 110 behave in the event of repeated failures to retrieve provisioning data; one option is to have them panic.

Threats

Since there's no positive identification of the mobile device 110 during provisioning, it is possible for an adversary to use brute force to determine the key fingerprints of legitimate mobile devices 110 and obtain the unencrypted revocation list and an encrypted contact list.

Brute force attacks on the provisioning protocol can be thwarted using firewall rules that disallow connections from devices that provide improper key fingerprints. Additionally, the size of the problem space for finding a legitimate key fingerprint is $2^{256}$ or roughly the difficulty of breaking AES in the first place. However, distributed attacks using a botnet could still, with time or luck, allow an adversary to retrieve encrypted provisioning data.

The most simple and likely attack against the provisioning protocol is a distributed denial of service (DDOS). Since there is no currently-known mechanism to stop DDOS attacks, the message broker 130 is designed to be distributed as a mitigation measure. Simply put, by placing message broker 130 servers in many physical locations around the world, a successful attacker would need more resources than if they were located in the same network facility.

The second major attack is to steal one of the servers used by the message broker 130 and deconstruct its data. However, the servers included in the message broker 130 are designed to be "dumb", and are themselves incapable of decrypting any operational data, not even contact lists. They act as repositories for data the Distributed C3i computers 120 produce. A complete compromise of a message broker 130 server would only allow an attacker access to the key fingerprints within the system and already-encrypted contact and configuration information. Additionally, until the compromise is discovered and the message broker 130 server's key is revoked, the attacker could eavesdrop on the encrypted contact list and configuration data updates from Distributed C3i computers 120; this is no different than would be possible with a network tap.

The exposure of key fingerprints does not permit any known attacks on the EC algorithm.

The exposure of the revocation list provides the adversaries with knowledge about how many devices have been compromised recently, and how quickly compromised devices are revoked.

The exposure of an encrypted contact list of a mobile device 110 provides a rough estimate of the number of contacts that device has.

The exposure of the encrypted contact list and configuration data traffic provides a rough estimate of how many contact lists are being updated and how many new mobile devices 110 are being provisioned at a given time Secure E-Mail As mentioned, secure e-mail is patterned from RFC 3156, which describes the use of Multipurpose Internet Mail Extension (MIME) attachments to hold an encrypted container. This container consists of three parts: an AES key encrypted with the recipient's public key, the e-mail data encrypted with the AES key (including attachments), and the sender's digital signature. These e-mails are then sent using the normal mechanism of the mobile device 110, typically the e-mail account provided by its wireless provider.

Preferably, an Encrypt-and-Sign approach is used to protect e-mail. In order to guard against a surreptitious forwarding attack, the e-mail body contains the sender's key fingerprint. The receiver's identity is guaranteed since the sender's digital signature would be invalid if the cipher text were re-encrypted to a third party. The digital signature attached to every encrypted e-mail provides authentication and non-repudiation for the message and its attachments.

Threats

The primary attack against secure e-mail is traffic analysis, as an adversary with physical access to the wireless provider's internal network could determine which mobile devices 110 were communicating with each other, even if the substance of the communication were indecipherable.

Directly attacking the cipher text would require breaking AES, while attacking the encrypted session key would require breaking ECC. There are no published direct attacks against either algorithm as of the filing of the present application.

Otherwise, a worst-case compromise of the receiving mobile device 110 while its private key is unlocked is required to recover the plaintext of an undeleted secure e-mail. If the compromised device's private key is locked but the device is not panicked in time, then an adversary would still have to break the private key's AES passphrase-based encryption.

Secure SMS/Text Messaging

Preferably, the Secure SMS functionality uses the Station-to-Station protocol (STS) to perform key agreement (Diffie, van Oorschot, & Wiener, 1992; incorporated by reference, above). Station-to-Station is a protocol based on the Diffie-Hellman key agreement algorithm. The present invention implements STS using a trusted public key infrastructure, making it an authenticated key agreement with key confirmation (AKC) protocol (Schneier, 1996). STS also trivially provides Perfect Forward Secrecy, protecting past conversations in the event that one of the mobile devices 110 is later compromised.

Key Agreement protocols require some messaging overhead before "real" messages can be sent; STS requires three. Instead of forcing a 3:1 overhead on all SMS messaging, the present invention views SMS messages as "sessions," allowing an STS-derived key to be used for many messages. When the user sends a message to a peer, if they already share a session, there is no overhead required. If the session has expired on either mobile device 110, the devices transparently restart the session using STS key agreement. Additionally, preferably, either user can force a session to restart at any time using a menu option.

Preferably, the STS key agreement generates an AES session key independently on both mobile devices 110; this AES key is then used to encrypt all subsequent text messages in the session. Preferably, after a session is closed, the SMS conversation history "times out," and is securely wiped.

As with e-mail, the primary attack threat against SMS involves traffic analysis. Again, an adversary with physical access to the wireless provider's internal network might be able to determine which mobile devices 110 were communicating with each other, even if the substance of the communication were indecipherable. Directly attacking the cipher text would require breaking AES. Attacking the key agreement protocol would require breaking EC Diffie-Hellman. To date, there are no known direct attacks against AES. There are indirect attacks against EC Diffie-Hellman, but they require the adversary to be a man-in-the-middle; these attacks are not possible against STS, as the protocol positively authenticates both sides of the connection using a trust strategy.

Secure Voice

The Secure Voice feature uses an encrypted Voice-over-IP solution that also uses the Station-to-Station protocol (STS) for key agreement. The cryptographic implementation is nearly identical to that of Secure SMS, except that the "messages" (voice packets) are sent several times per second, and each "session" is one phone call. This also means that Secure Voice provides Perfect Forward Secrecy just as Secure SMS does. Preferably, Secure Voice uses the Industry-standard Secure Real-time Transport Protocol (SRTP) to protect and transport the voice data stream. SRTP is the peer-to-peer voice stream and is protected with AES.

Again, the primary attack against the Secure Voice solution is traffic analysis; this is more relevant since the mobile devices 110 involved in the call will be constantly sending and receiving the encrypted voice stream. Another attack would be to disrupt a voice call through a denial of service. An adversary could either actively jam the cellular data transmission, or flood the network with data to disrupt the communications. This would only disrupt the call; it would not compromise the conversation.

Like SMS and E-Mail communications, preferably, 256-bit AES for voice encryption is used. Directly attacking the voice stream's cipher text would require breaking AES or EC Diffie-Hellman. As noted, there are no known attacks against AES. There are indirect attacks against EC Diffie-Hellman, but they require the adversary to be a man-in-the-middle; these attacks are not possible against STS as the protocol positively authenticates both sides of the connection using a trust strategy.

Protection of Network Assets

The majority of the network infrastructure is designed to have low physical security requirements, be distributed, scalable and robust. This lowers cost and it lowers risk: stealing a message broker 130 server or somehow secretly compromising its operating software provides no more help to the adversary than simple traffic analysis.

The Certificate Authority 140 is the one portion of the infrastructure that must be highly protected. Luckily, it only rarely requires use, and typically will spend its operational life in a vault, for example.

As mentioned above, all trust in the system flows "down" from the Certificate Authority, and as such, it must be specially protected. The Certificate Authority 140 is, in essence, nothing more than a private key. However, since this private key is at the root of all trust in the system, its security is paramount. Its compromise requires the entire system to be shut down and re-provisioned before trust can be re-established.

In preferred embodiments, the Certificate Authority 140 is designed as a commodity laptop computer with a strongly-encrypted, passphrase-protected hard disk. Within the encrypted hard disk is the wrapped private key; preferably, this private key requires both a passphrase and a Smart Card to decrypt. Preferably, the laptop computer is stored in a GSA-approved Class 5 (or better) safe. The Smart Card is stored separately from the laptop computer and is subject to the same level of physical security.

As mentioned, preferably, the Certificate Authority 140 will never be connected to any computer network, as such only a physically-present adversary could compromise its private key, and only by first acquiring both the laptop and the Smart Card, having the necessary passphrase for the laptop's encrypted hard disk, and having the necessary passphrase for the Smart Card.

Preferably, transfer of key signing requests and the signature responses between the Certificate Authority 140 and a newly-configured top-trust Distributed C3i computer 120 occurs via one-time-use flash memory transfer devices (USB drives). These drives are scanned for malicious code at the Distributed C3i computer 120 immediately after being removed from their retail packaging. Then the Distributed C3i computer 120 saves its signature request to the drive which is then moved to the Certificate Authority 140. The Certificate Authority 140 signs the signature request of the Distributed C3i computer 120 and stores the response to the drive. The operator verifies the drive contains no information beyond the signature request and response and then returns it to the Distributed C3i computer 120.

Memory Wipe Improvements

One significant issue with wiping data from solid state disks is that almost all solid state media use wear-leveling memory controllers to increase their operational lifespan. Wiping data around a wear-leveling memory controller is challenging, and ultimately the only way to guarantee that all data is unrecoverable requires completely filling the disk's free space with zeroes. Current-generation hardware can take 15 minutes or more to perform this operation on a large disk.

Dramatic improvement to the speed of a guaranteed data wipe can be accomplished even with a wear-leveling controller by pre-filling the disk with empty files to ensure that the disk appears mostly-full at all times. This reduces the amount of free space that the wear-leveling algorithm can use, and reduces the amount of time necessary to reach a completely-sanitized state where the disk contains nothing but zeroes. As the user saves files to the disk, the pre-filled empty files are deleted to keep the disk's available capacity at a fixed percentage, such as 90%, to provide predictably short data wipe times.

While wear-leveling succeeds admirably in increasing the lifespan of each flash memory sector, the procedure's very nature means that an attempt to write a zero over a particular bit of sensitive data is unlikely to directly succeed. Take as an example the scenario where a byte of sensitive information is located at logical disk location 0. When attempts are made to overwrite that byte of information, the wear-leveling memory controller redirects the memory write from the logical disk location 0 to the physical disk location 8. To make matters worse, the reallocation for the byte of sensitive information was physical disk location 5, and that sensitive data still exists on the storage device, even if it is no longer addressable.

Practically speaking, because solid state memory devices using wear-leveling use it for all write operations, the persistence of individual bytes of sensitive information in solid state memory is less of an issue than it may first appear; the wear-leveling controller's state is determined in part by a one-way hash function that makes it extremely difficult to determine the past correlations between logical memory locations and physical memory locations.

While this invention has been described in conjunction with the various exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A system for providing secure communication via a public carrier network, comprising:
    stored in each mobile device that is in communication with another such mobile device via the network, an application configured to effect, by the mobile device, encryption of data packets sent to, and decryption of data packets received from, the other mobile device, the data packets containing information enabling the communication;
    wherein each of the mobile devices involved in the communication receives its public key signed via the ultimate trust authority prior to initializing such secure communication; and wherein each mobile device generates its own private key without exposing its private key to any other device; and
    wherein each of the mobile devices is configured with a shadow contact list such that the secure communication is only allowed between mobile devices each having the other in its shadow contact list.

2. The system of claim 1, wherein each of a pair of mobile devices performs mutual authentication to determine whether the secure communication is allowed.

3. The system of claim 1, further comprising:
    a Certificate Authority having ultimate trust authority;
    and a plurality of C3i computers for provisioning other devices;
    wherein each of the C3i computers was provisioned by an already-provisioned C3i computer or the Certificate Authority.

4. The system of claim 3, wherein the C3i computers know which other devices each device can contact, effectively establishing an association graph between the mobile devices.

5. The system of claim 4, wherein the C3i computers use the association graph to execute actions targeted on a per device basis.

6. The system of claim 5, wherein an action includes distributing target revocation lists per device.

7. The system of claim 3, wherein at least one of the C3i computers was provisioned by an already-provisioned C3i computer.

8. The system of claim 1, wherein the application is further configured to effect, by the mobile device, wiping data from the memory of the mobile device responsive to a panic indication.

9. The system of claim 8, wherein a predetermined portion of the memory of the mobile device is set to a predetermined value to reduce the number of operations needed to perform the wiping.

10. A method for providing secure communication via a public carrier network, comprising:
- storing, in each mobile device that is in communication with another such mobile device via the network, an application configured to effect, by the mobile device, encryption of data packets sent to, and decryption of data packets received from, the other mobile device, the data packets containing information enabling the communication;
- wherein each of the mobile devices involved in the communication receives its public key signed via the ultimate trust authority prior to initializing such secure communication; and wherein each mobile device generates its own private key without exposing its private key to any other device; and
- wherein each of the mobile devices is configured with a shadow contact list such that the secure communication is only allowed between mobile devices each having the other in its shadow contact list.

11. The method of claim 10, wherein each of a pair of mobile devices performs mutual authentication to determine whether the secure communication is allowed.

12. The method of claim 10, further comprising:
- a Certificate Authority having ultimate trust authority;
- and a plurality of C3i computers for provisioning other devices;
- wherein each of the C3i computers was provisioned by an already-provisioned C3i computer or the Certificate Authority.

13. The method of claim 12, wherein the C3i computers know which other devices each device can contact, effectively establishing an association graph between the mobile devices.

14. The method of claim 13, wherein the C3i computers use the association graph to execute actions targeted on a per device basis.

15. The method of claim 14, wherein an action includes distributing target revocation lists per device.

16. The method of claim 10, wherein the application is further configured to effect, by the mobile device, wiping data from the memory of the mobile device responsive to a panic indication.

17. The method of claim 16, wherein a predetermined portion of the memory of the mobile device is set to a predetermined value to reduce the number of operations needed to perform the wiping.

18. A non-transient computer-readable medium which stores a set of instructions which when executed performs a method for providing secure communication via a public carrier network, comprising:
- storing, in each mobile device that is in communication with another such mobile device via the network, an application configured to effect, by the mobile device, encryption of data packets sent to, and decryption of data packets received from, the other mobile device, the data packets containing information enabling the communication;
- wherein each of the mobile devices involved in the communication receives its public key signed via the ultimate trust authority prior to initializing such secure communication; and wherein each mobile device generates its own private key without exposing its private key to any other device; and
- wherein each of the mobile devices is configured with a shadow contact list such that the secure communication is only allowed between mobile devices each having the other in its shadow contact list.

* * * * *